United States Patent [19]
Ohta et al.

[11] 3,759,582
[45] Sept. 18, 1973

[54] FAULT DETECTING SYSTEM FOR VEHICLE ANTI-SKID CONTROL SYSTEMS

[75] Inventors: Jun Ohta, Toyota; Atsutoshi Okamoto, Toyohashi; Akio Sugiura, Nagoya, all of Japan

[73] Assignees: Nippondenso Co., Ltd., Aichi-ken; Toyota Jidosha Kogyo Kabushiki Kaisha, Toyota-shi, both of Japan

[22] Filed: Aug. 17, 1971

[21] Appl. No.: 172,418

[30] Foreign Application Priority Data
Aug. 18, 1970 Japan.............................. 45/72269
Sept. 11, 1970 Japan.............................. 45/80267
Sept. 29, 1970 Japan.............................. 45/85442

[52] U.S. Cl. ......................... 303/21 AF, 340/52 B
[51] Int. Cl. ............................................. B60t 8/00
[58] Field of Search ............... 303/20, 21; 317/135; 318/563; 324/51, 73 R; 340/46, 52 R, 52 B

[56] References Cited
UNITED STATES PATENTS

| | | |
|---|---|---|
| 3,620,577 | 11/1971 | Neisch et al. ................... 303/21 EB |
| 3,608,979 | 9/1971 | Coyle ............................. 303/21 EB |
| 3,650,574 | 3/1972 | Okamoto et al. ............... 303/21 AF |
| 3,674,319 | 7/1972 | Brugger et al. ................. 303/21 CG |

*Primary Examiner*—Milton Buchler
*Assistant Examiner*—Stephen G. Kunin
*Attorney*—Cushman, Darby & Cushman

[57] ABSTRACT

A fault detecting system for detecting faults in an anti-skid control system for vehicles which system prevents the loss of steering capacity, the abnormal spinning of the vehicle body and the like due to the locking of the wheel which occurs when an excessively large braking pressure is applied rapidly to a vehicle such as an automobile.

13 Claims, 6 Drawing Figures

FAULT DETECTING SYSTEM FOR VEHICLE ANTI-SKID CONTROL SYSTEMS

The present invention relates generally to a fault detecting system for vehicle anti-skid control systems and more particularly to a fault detecting system designed to detect fault conditions in an anti-skid control system for vehicles, which prevents the loss of steering capacity and abnormal spinning of the vehicle body induced by the locking of the wheels which occurs when an excessively large braking pressure is applied rapidly to a vehicle such as an automobile.

Anti-skid control systems for vehicles which have hitherto been used are designed such that when there is a tendency for the wheels to lock due to the rapid braking of a vehicle and the application of an excessively large braking pressure to the wheels, a braking pressure control means for forcibly reducing the braking pressure applied to the wheel is brought into action to prevent the locking of the wheel thereby braking the vehicle safely without allowing the vehicle to skid. However, the conventional systems of this type have disadvantages in that should the braking pressure control means fail for some reason or other in the direction which allows the continued releasing of the braking pressure, the driver can no longer apply the required braking pressure to the wheel no matter how hard the driver presses the brake pedal with the result that the braking system loses its braking capacity thereby giving rise to a serious problem that could affect people's lives.

Figure 1:
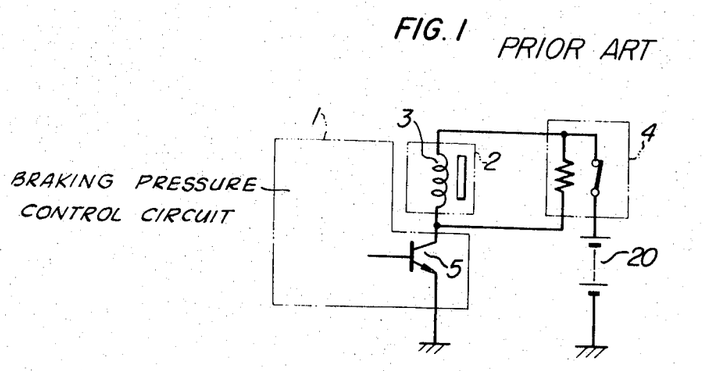
FIG. 1 is an electrical wiring diagram of a conventional fault detecting device for vehicle anti-skid control systems.

To solve the foregoing problem of faults in anti-skid control systems, devices of the type shown in FIG. 1 have hitherto been proposed. In FIG. 1, numeral 1 designates a braking pressure control circuit designed to detect, from a parameter such as the peripheral deceleration of the wheel indicating that the wheel is on the point of locking, a tendency for the wheel to lock and the locked wheel thereby producing an electrical signal (hereinafter referred to as a "pressure reducing signal") for forcibly reducing the braking pressure applied to the wheel independent of the driver's will. Numeral 2 designates a braking pressure control solenoid valve which serves to forcibly reduce the braking pressure (oil pressure or air pressure) applied to the wheel when the pressure reducing signal from the braking pressure control circuit 1 is applied to its magnetic coil 3 through a transistor 5. Numeral 4 designates a bimetal switch connected in parallel with the magnetic coil 3, 4a a resistor for heating the bimetal strip, 4b normally closed bimetal contacts adapted to be heated with the heat generated by the resistor 4a.

With the conventional device of the type described above, when the braking pressure control circuit 1 becomes faulty in the direction that allows the continued releasing of the braking pressure, that is, when the pressure reducing signal is continuously produced, the transistor 5 is maintained in the conduction state and at the same time a current is continuously supplied to the resistor 4a of the bimetal switch 4 so that the resistor 4b generates heat which in turn opens the normally closed bimetal contacts 4b to disconnect the magnetic coil 3 from a storage battery 20, thereby returning to the normal conditions wherein the braking operation can be effected by depressing the brake pedal, i.e., the condition obtainable when no vehicle anti-skid control system is used.

However, a disadvantage of the conventional device of the type described above is that there is the danger of the bimetal switch 4 being influenced by the external temperature so that misoperation thereof may be caused. Furthermore, the experiments conducted by the inventors have shown that the conventioanl device of the type described had a very poor response characteristic. In other words, it requires 30 to 40 seconds to open the normally closed bimetal contacts 4b of the bimetal switch 4 after the detection of the failure of the vehicle anti-skid control system in the direction which reduces the braking pressure, and thus the braking system has no braking capacity at all during the delay time attended by the opening of the normally closed bimetal contacts 4b of the bimetal switch 4 so that no matter how hard the brake pedal is depressed no braking pressure is applied to the wheel, thereby giving rise to a problem of accidents that would endanger life. Moreover, since the current supply to the resistor 4a will be stopped upon the opening of the normally closed bimetal contacts 4b of the bimetal switch 4 subsequent to the occurrence of such fault, the resistor 4a stops generating heat and it gradually cools down so that the normally closed bimetal contacts 4b are closed again notwithstanding the fault being still unremoved and thereafter the bimetal contacts 4b repeatedly to open and close. Thus, there is a deficiency that the occurrence of such fault produces an intermittent current supply to the magnetic coil 3, thereby making the described conventional device practically useless as a safety device against such faults.

It is therefore an object of the present invention to provide a fault detecting system for vehicle anti-skid control systems comprising a braking pressure control circuit for detecting the wheel tending to lock and the locking of the wheel to generate a pressure reducing signal for reducing the braking pressure applied to the wheel, a braking pressure modulator adapted to be energized by the pressure reducing signal from the braking pressure control circuit to reduce the braking pressure applied to the wheel, an actuation detector for detecting the actuation of the braking pressure modulator to produce an electrical signal, a first logical element for forming the logical product of the output signal from the actuation detector and the pressure reducing signal from the braking pressure control circuit, a second logical element for forming the logical sum of the output signal from the first logical element and the pressure reducing signal from the braking pressure control circuit, a timer circuit for producing an output signal when the output signal from the second logical element continues to be on in excess of a predetermined time, and a memory circuit for storing the output signal from the timer circuit.

It is another object of the present invention to provide a fault detecting system of the type just described, further including control means for receiving the output signal from the memory circuit to come into action to attend to the fault in the anti-skid control system.

According to the present invention, if, for some reason or other, the braking pressure control circuit becomes faulty so as to continually produce the braking pressure reducing signal, or if the braking pressure modulator comes into operation in spite of the fact that the braking pressure control circuit is in normal condition thus producing no pressure reducing signal, such faults can be readily detected by means of the first and second logical elements and the timer circuit, and moreover the fact that all the fault detecting procedures are effected electrically results in an improved response characteristic of the system of the present invention which is far better than those of the conventional devices employing bimetal switches, and at the same time other factors such as the external temperature can have no effect on the system of the present invention, thereby making the system highly reliable and positive in operation. Furthermore, the control means is actuated by the output signal from the memory circuit so that the vehicle, while running, can be maintained in a safe direction for attending to the fault in the anti-skid control system, thereby greatly assisting the safe driving of the vehicle.

A further object of the present invention is to provide a fault detecting system for vehicle anti-skid control systems of the type described wherein switch means is provided which receives the output signal from the memory circuit to break the circuit between the braking pressure modulator and the power source.

Thus, according to the present invention, if, for some reason or other, the braking pressure control circuit becomes faulty so as to continually produce the pressure reducing signal and if any fault occurs so that the magnetic coil of the braking pressure modulator is short-circuited to the ground thereby continuously energizing the magnetic coil, the switch means is actuated by the output signal from the memory circuit to prevent the current supply to the braking pressure modulator so that the braking pressure can be applied to the wheel through the normal operation of depressing a brake pedal, thus preventing accidents such as the runaway of the vehicle and the end-collision due to the uncontrollability of braking operation.

A still further object of the present invention is to provide a fault detecting system of the type described wherein a warning device is provided which is operable upon receipt of the output signal from the memory circuit.

Thus, according to the present invention, whenever any fault occurs that would cause the continued reducing of the braking pressure, the warning device gives warning to indicate the occurrence of the fault so that the driver knows from the warning that the anti-skid control system has failed in the direction which allows the continued releasing of the braking pressure.

It is a still further object of the present invention to provide a fault detecting system of the type described wherein a holding circuit is further provided to hold the output signal of the braking pressure control circuit for a predetermined time.

Thus, according to the present invention, should the delay attended by the mechanical operation of the braking pressure modulator produce a condition as if the braking pressure modulator were faulty, the action of the holding circuit to hold the pressure reducing signal produced immediately before the occurrence of such condition as well as the action of the first logical element make it possible to decide whether the said condition is due to any fault in the braking pressure control circuit or the failure of the braking pressure modulator itself, thereby preventing any misoperation due to the delay in the operation of the modulator. As a result, said predetermined time provided fro the timer circuit to prevent any misoperation due to the delayed operation needs not be especially long so that the required fault detection can be effected more rapidly than when the predetermined time is made longer and at the same time an inexpensive small-capacity capacitor may be employed for the capacitor on which said predetermined time depends, for example.

It is a still further object of the present invention to provide a fault detecting system for vehicle anti-skid control systems comprising a braking pressure control circuit for detecting a tendency for the wheel to lock and the locking of the wheel to produce an electrical signal for reducing the braking pressure applied to the wheel, a braking pressure modulator adapted to be energized upon receipt of the output signal from the braking pressure control circuit to reduce the braking pressure applied to the wheel, a holding circuit for holding the output signal from the braking pressure control circuit for a predetermined time, an actuation detector for detecting the actuation of the braking pressure modulator to produce an electrical signal, a first logical element for forming the exclusive logical sum of the output signal from the holding circuit and the output signal from the actuation detector, a second logical element for forming the logical sum of the output signal from the first logical element and the output signal from the braking pressure control circuit, a timer circuit for producing an output signal when the output signal from the second logical element remains on in excess of a predetermined time, and a memory circuit for storing the output signal from the timer circuit.

Thus, according to the present invention, if, for some reason or other, the braking pressure control circuit becomes faulty in a direction which continuously produces the pressure reducing signal to allow continued releasing of the braking pressure, or if the braking pressure modulator fail in a direction which continuously reduces the braking pressure in spite of the fact that the braking pressure control circuit is in a normal condition thus producing no pressure reducing signal, in either of the above two types of fault condition, the fault can be readily detected by means of the first and second logical elements, the holding circuit and the timer circuit, further in the case of a fault on the "fail safe" side where the brake pressure modulator fails in the direction which does not reduce the braking pressure in spite of the fact that the braking pressure control circuit is in a normal condition and has produced the pressure reducing signal, the action of the first logical element for forming the exclusive logical sum permits the detection of such a fault on the fail safe side and moreover the ability to detect such fail safe side fault conditions makes it possible to detect not only faults in the braking pressure modulator, but also breakage, short-circuiting and other faults in the wire harness interconnecting the braking pressure control circuit and the braking pressure modulator, and further faults in the actuation detecting switch along with the above-mentioned fault detecting operation.

Furthermore, the output signal produced by the memory circuit upon detection of the fault actuates the control means designed to operate so as to attend to faults in the anti-skid control system so that the vehicle can be maintained in a safe direction while running.

Still furthermore, the afore-mentioned fault detecting procedures are all carried out in the manner which is digital in nature and thus the response characteristic of the system according to the present invention is greatly improved over that of the conventional devices employing bimetal switches and at the same time the system can be expected to operate in a highly reliable manner without any possibility of being affected by the power supply voltage, external temperature and so on. Besides, when employing integrated circuits, the system of the present invention is advantageous over the analog-type systems and it can also be made smaller and more compact.

Still furthermore, if the actuation detecting switch produces an apparently abnormal signal because of a delay in the mechanical operation of the braking pressure modulator when the braking pressure control circuit, braking pressure modulator and actuation detecting switch are all in a normal condition and the pressure reducing signal is repeatedly produced at a very short period, or if the actuation detecting switch produces an apparently abnormal signal because of the design specification of the spring or the like in the braking pressure modulator when an excessively large braking pressure is applied to the wheel, it is possible to accurately detect whether or not the apparently abnormal signal is a proper one due to the pressure reducing signal, thereby preventing the control means from being actuated unnecessarily by mistake under these circumstances.

The above and other objects and advantages of the invention will be readily apparent from the following detailed descriptions of the preferred embodiments of the present invention taken in conjunction with the accompanying drawings, in which.

Figure 2:
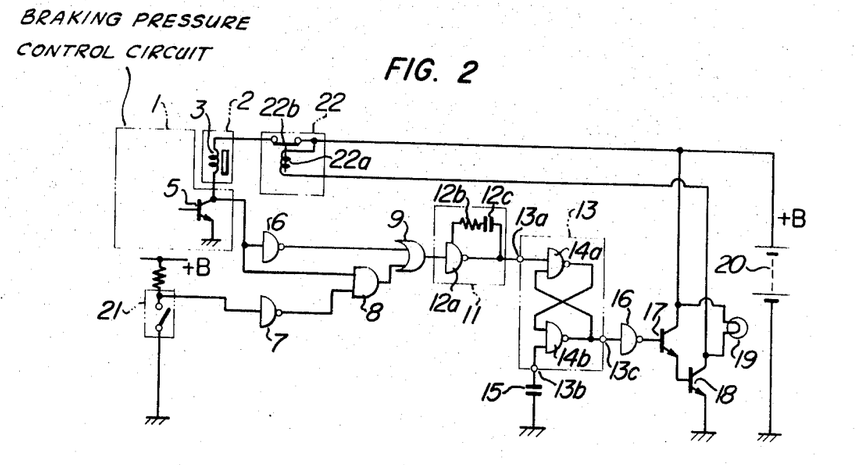
FIG. 2 is an electrical wiring diagram showing an embodiment of the fault detecting device for vehicle anti-skid control systems according to the present invention.
Figure 3:
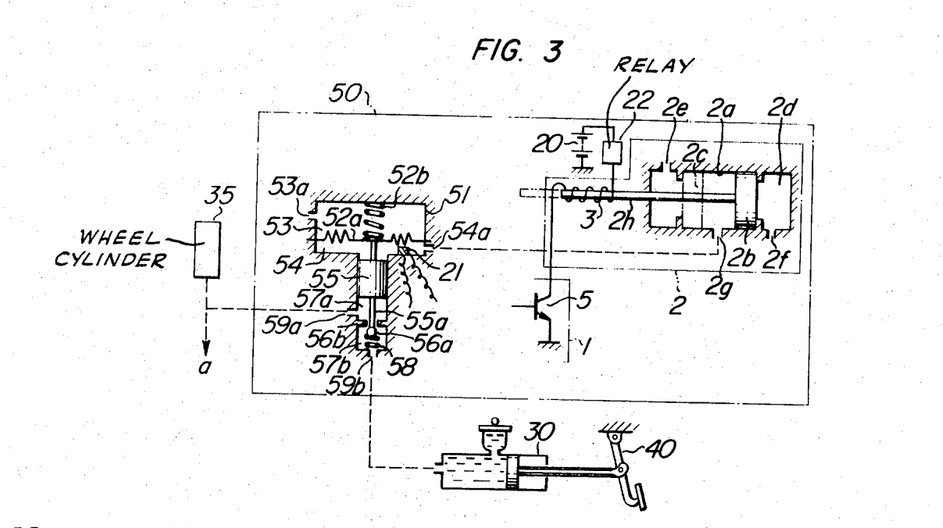
FIG. 3 is a schematic diagram showing in section an embodiment of the braking pressure modulator incorporated in the system of the present invention.

Referring now to FIGS. 2 and 3 of the drawings, the present invention will be explained hereunder.

In FIG. 2 in which the identical reference numerals as used in FIG. 1 designate the identical parts or the equivalents thereof, numeral 1 designates a braking pressure control circuit designed to detect, from a parameter such as the peripheral deceleration of the wheel indicating that the wheel is on the point of lock, a tendency for the wheel to lock as well as the locked wheel to thereby produce a pressure reducing signal. Experimental tests conducted by the inventors have shown that the duration time of the pressure reducing signal was less than a predetermined time of 0.5 seconds, for example. Numeral 2 designates a braking pressure control solenoid valve incorporated in a braking pressure modulator which will be explained later, the solenoid valve being operable to forcibly reduce the braking pressure (oil pressure, air pressure, etc.) applied to the wheel upon application of the pressure reducing signal to its magnetic coil 3. Numeral 5 designates the final stage transistor in the braking pressure control circuit 1, which is connected in series with the magnetic coil 3 of the braking pressure control solenoid valve 2; 6, 7 and 16, NOT circuits for reversing the phase of an input signal; 8 an AND circuit; 9 an OR circuit; 11 a timer circuit; 12a a NOT circuit; 12b a time-delay resistor; 12c a time-delay capacitor. The NOT circuit 12a will not reverse the phase of an input signal until the input signal remains on in excess of a predetermined time of 3.0 seconds, for example, which is dependent on the time constant of the capacitor 12c and the resistor 12b. Numeral 13 designates a memory circuit employing NAND circuits 14a and 14b which constitute an SR flip-flop circuit, 13a a set terminal, 13b a reset terminal. Numeral 15 designates a capacitor constituting a reset capacitor for the said flip-flop circuit; 17 and 18 transistors; 19 a warning device employing a lamp; 22 a relay; 22a a relay coil; 22b normally closed relay contacts; 20 a storage battery installed in the vehicle; 21 an actuation detecting switch disposed within the braking pressure modulator which will be explained later, the switch being adapted to detect whether or not the braking pressure modulator has been actuated and it opens or closes accordingly.

Next, the operation of the braking pressure modulator will be explained with reference to FIG. 3. In the figure, numeral 30 designates a master cylinder for producing a hydraulic pressure corresponding to the degree of depression of a brake pedal 40. Numeral 50 designates the braking pressure modulator; 51 a casing divided into two chambers 53 and 54 by a diaphragm 52a; 52b a spring disposed within the chamber 53; 55 a piston having one end connected to the diaphragm 52a and the other end, i.e., a valve operating portion 55a being adapted to be urged against a valve 56a; 56b a valve seat for the valve 56a separating chambers 57a and 57b from each other; 58 a spring exerting a force on the valve 56a to urge it against valve seat 56b; 59a a port communicating the chamber 57a to a wheel cylinder 35 for applying the brake shoe of the wheel; 59b a port for communicating the chamber 57b with the master cylinder 30. An arrow a designates an oil passage leading to another wheel cylinder. The chamber 53 in the casing 51 is communicated into the intake manifold of an engine installed in the vehicle. Numeral 21 designates the actuation detecting switch which may be a microswitch securely mounted on the wall of the chamber 54 within the casing 51 with the diaphragm 52a serving as a driving source for opening and closing the contacts of the switch. The braking pressure control solenoid valve 2 comprises a piston 2b slidably mounted in a cylinder 2a and two chambers 2c and 2d divided by the piston 2b. The chamber 2c is communicated with the intake manifold of the vehicle engine through a port 2e and the other chamber 2d is normally opened to the atmosphere through a port 2f. The chamber 2c is also communicated via a third port 2g with the chamber 54 in the casing 51 through its port 54a. Numeral 2h designates an operating rod of a magnetic material connected to the piston 2b and the magnetic coil 3 is wound on the outer periphery of the operating rod 2h.

Next, the operation of the system of the present invention constructed as described above will be explained. The operation of the braking pressure modulator 50 shown in FIG. 3 will be explained first. When the braking pressure control circuit 1 is producing no pressure reducing signal so that the transistor 5 is in the non-conductive state and hence the magnetic coil 3 of the braking pressure control solenoid valve 2 is not energized, the piston 2b will be in the position shown with full lines so that the engine intake manifold vacuum is admitted from the engine intake manifold into the chamber 2c and the manifold vacuum is further admitted into the chamber 54 in the casing 51. On the other hand, the engine intake manifold vacuum is normally admitted into the chamber 53 in the casing 51. Thus, an equal vacuum exists in both chambers 54 and 53 so that the diaphragm 52a is urged into the chamber 54 by the spring pressure of the spring 52b and hence the piston 55 is moved thus urging its valve operating portion 55a against the valve 56a to move the valve 56a against the spring force of the spring 58, thereby opening the valve 56a. When this happens, the chambers 57a and 57b communicate with each other so that the hydraulic pressure produced in the master cylinder 30 in correspondence with the movement of the brake pedal 40 is directly transmitted to the wheel cylinder 35 through the chambers 57a and 57b, thus permitting the normal braking operation. In this state, that is, with the diaphragm 52a being urged into the chamber 54, the actuation detecting switch 21 is open since its contacts are being pressed by the diaphragm 52a.

Then, when the braking pressure control circuit 1 produces its pressure reducing signal, the transistor 5 will be rendered conductive to thereby energize the magnetic coil 3 of the braking pressure control solenoid valve 2, so that the piston 2b is attracted to the position shown with dotted lines by means of the operating rod 2h. This introduces the atmospheric pressure from the chamber 2d into the chamber 2c and this atmospheric pressure is also admitted into the chamber 54 of the casing 51, so that since the engine intake manifold vacuum is being introduced into the chamber 53, the diaphragm 52a is moved into the chamber 53 by the atmospheric pressure in the chamber 54 against the spring force of the spring 52b, thereby moving the piston 55 to separate its valve operating portion 55a from the valve 56a. When this happens, the valve 56a is urged by the spring force of the spring 58 against the valve seat 56b where the valve 56a stays shut. This in turn disconnects the chamber 57a from the chamber 57b and at the same time the movement of the piston 55 increases the volume of the chamber 57a so that the hydraulic pressure in the wheel cylinder 35 communicating with the chamber 57a drops to reduce the braking pressure applied to the wheel. In this way, whenever there is a tendency for the wheel to lock, the braking pressure applied to the wheel can be forcibly reduced to prevent locking of the wheel. With the pressure reducing signal now being produced, i.e., with the diaphragm 52a now being moved into the chamber 53, the actuation detecting switch 21 is closed since the diaphragm 52a is out of engagement with its contacts thus not pressing on the contacts any longer.

In the event that the pressure reducing signal is produced in the normal condition of the braking pressure control circuit 1, the pressure reducing signal will take the form of a pulse-like signal having a duration time not longer than 0.5 seconds so that the transistor 5 is repeatedly turned on and off by the pressure reducing signal, thereby producing a "0" signal for each conduction of the transistor 5 and a "1" signal for every non-conduction of the transistor 5.

On the other hand, the opening and closing of the actuation detecting switch 21 produce "1" (opened) and "0" (closed) signals, respectively, so that the AND circuit 8 forms the logical product of the pressure reducing signal and said "1" and "0" signals having their phases being inverted by the NOT circuit 7. On the other hand, the OR circuit 9 provides the logical sum of the pressure reducing signal and the output signal from the AND circuit 8. In this connection, when both the braking pressure control circuit 1 and the braking pressure modulator 50 are functioning properly, if the pressure reducing signal is generated thereby closing the actuation detecting switch 21, then the output signal of the OR circuit 9 assumes the "1" state, whereas if no pressure reducing signal is produced so that the actuation detecting switch 21 is open, then the output signal of the OR circuit 9 assumes the "0" state. The output signal from the OR circuit 9 is then applied to the timer circuit 11 where the phase inversion of the signal takes place. However, this phase inversion does not take place until the signal applied to the NOT circuit 12a remains on in excess of a predetermined time of 3.0 seconds, for example, depending on the time constant of the resistor 12b and the capacitor 12c, since the timer circuit 11 has a time-delay characteristic provided by the resistor 12b and the capacitor 12c. Therefore, since the duration time of the normal pressure reducing signal is less than 0.5 second, no phase inversion of the signal takes place in the NOT circuit 12a and hence the flip-flop circuit comprising the NAND circuits 14a and 14b is not switched so that the condition obtained upon connection of the power source is maintained, that is, the flip-flop circuit maintains the output which is effective to render the transistors 17 and 18 non-conductive. The reason is that the flip-flop circuit was previously set in the condition described by the reset capacitor 15 upon connecting the power source. Thus, with the transistors 17 and 18 non-conducting, the lamp of the warning device 19 is off and the normally closed contacts 22b of the relay 22 remain closed.

On the other hand, if a fault occurs so that the braking pressure control circuit 1 becomes faulty in the direction which continues to generate the pressure reducing signal, thereby rendering the final stage transistor 5 continually conductive, or causing the transistor 5 to break and remain conductive or causing the magnetic coil 3 to be short-circuited to the ground, the magnetic coil 3 will be allowed to remain energized to keep the actuating detecting switch 21 closed, and the output signal of the AND circuit 8 for forming the logical product of the "0" signal from the collector of the transistor 5 and the "1" signal which is the "0" signal produced by the actuation detecting switch 21 and inverted by the NOT circuit 7 assumes the "0" state, which "0" signal indicating that the abnormal pressure reducing signal has been produced, but the braking pressure modulator 50 is functioning properly. On the other hand, the phase of the "0" signal produced at the collector of the transistor 5 under the fault condition described is inverted by the NOT circuit 6 to produce a "1" signal which is in turn applied to the OR circut 9 along with the "0" signal from the AND circuit 8 so that the OR circuit 9 produces a "1" signal. In this case, since the pressure reducing signal is being produced continually, the "1" signal from the OR circuit 9 remains on in excess of a predetermined time of 3.0 seconds, for example, as determined by the timer circuit 11 so that its phase is inverted by the NOT circuit 12a in the timer circuit 11 to produce a "0" signal at the output terminal 13c of the flip-flop circuit constituting the memory circuit 13. The phase of the "0" signal is then inverted by the NOT circuit 16 to produce a "1" signal which is in turn applied to the base of the transistor 17 to switch it to the conducting state. Following this, the transistor 18 is also switched to the conducting state so that a current is supplied from the battery 20 through the transistors 17 and 18 to the lamp of the warning device 19, which is then lit to indicate that a ground fault is present either in the braking pressure control circuit 1 or the magnetic coil 3. While at the same time, the relay coil 22a of the relay 22 is energized to open the normally closed contacts 22b. This disconnects the magnetic coil 3 from the power source, thus returning the vehicle to the condition in which no pressure reducing signal is produced, i.e., the condition under which normal braking operation can take place.

Assume now that the braking pressure control circuit 1 is in normal condition so that no pressure reducing signal is produced thus rendering the transistor 5 nonconductive and at the same time there is no ground fault in the magnetic coil 3. Then, should for some reason or other the braking pressure modulator 50 become faulty at a part thereof in the direction which allows the braking pressure to be reduced continuously and the actuation detecting switch 21 is kept closed, that is, when a fault condition occurs which is similar to the one in which the pressure reducing signal is continuously produced, the AND circuit 8 will form the logical product of the "1" signal obtained by inverting the phase of the "0" signal from the actuation detecting switch 21 in the NOT circuit 7 and the "1" signal from the collector of the transistor 5, thereby producing a "1" signal. At this time, the "1" signal from the AND circuit 8 indicates that although the pressure reducing signal is not produced, there is a fault in some part of the braking pressure modulator 50 for some reason or the other. Thus, when the "1" signal from the AND circuit 8 and the "0" signal, i.e., the "1" signal produced at the collector of the transistor 5 and having its phase inverted in the NOT circuit 6, are applied to the OR circuit 9, the OR circuit 9 produces a "1" output signal which is the "1" signal from the AND circuit 8. When the "1" signal from the OR circuit 9 remains on in excess of a predetermined time of 3.0 seconds, for example, that is, at the expiration of more than 3 seconds after the failure of the braking pressure modulator 50 in the direction which allows the continued releasing of the braking pressure, the NOT circuit 12a of the timer circuit 11 inverts the phase of the signal to produce a "0" signal which in turn actuates the flip-flop circuit of the memory circuit 13 to produce a "0" signal at its output terminal. The "0" signal is then inverted by the NOT circuit 16 to produce a "1" signal which is applied to the base of the transistor 17, thus switching the transistors 17 and 18 to the conducting state. This causes the lamp of the warning device 19 to come on thereby giving warning that the braking pressure modulator 50 is faulty in the direction which allows the braking pressure to be continuously reduced, while at the same time the relay coil 22a of the relay 22 is energized so that the normally closed contacts 22b are opened to disconnect the magnetic coil 3 from the power source.

While in the embodiment described hereinbefore the control means which operates upon receipt of the output signal from the memory circuit 13 has been illustrated as consisting of the warning device 19 and the relay 22, many other modifications and embodiments of the control means are possible. For instance, the control means may be designed such that when the braking pressure modulator 50 fails in the direction which allows the braking pressure to be continually reduced, or alternately when the final stage transistor 5 in the braking pressure control circuit 1 is rendered continually conductive as a result of such a fault, the control means receives the "0" signal produced at the output terminal 13c so that the ignition circuit of the vehicle engine is first disconnected from the power source and then an electromagnetic brake, parking brake or the like which is installed in addition to the main brake system is actuated, thereby automatically applying the braking pressure to forcibly bring the vehicle to a temporary stop for facilitating a repair of the fault.

Furthermore, while in the embodiment described hereinbefore the actuation detecting means for detecting whether or not the braking pressure modulator 50 has come into action upon application of the pressure reducing signal thereto has been described as being consisted of the actuation detecting switch 21 comprising a microswitch designed to sense the actuation of the modulator 50 as the movement of the diaphragm 52a, any switch of this kind may be equally employed such that the actuation of the braking pressure modulator 50 is detected, for example, by the movement of the valve operating portion 55a connected to the piston 55. In addition, the relay 22 may be replaced with a semiconductor switching element consisting of a transistor or the like.

Figure 4:
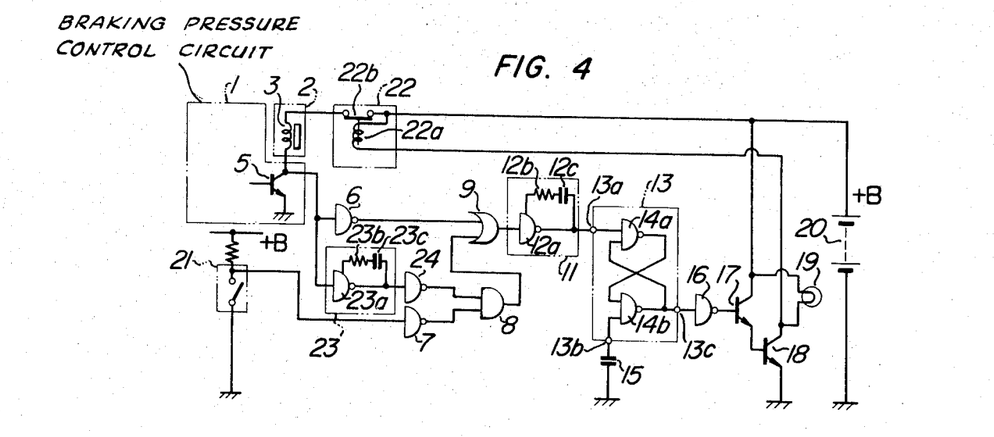
FIG. 4 is an electrical wiring diagram showing another embodiment of the present invention.

Referring now to FIG. 4, another embodiment of the present invention will be explained. The system of this embodiment is identical with that of the embodiment shown in FIG. 2 excepting that a holding circuit and a NOT circuit associated therewith are further included. Therefore, only the additional elements will be explained. However, the operation of the remaining elements which are designated by the identical reference numerals as used in connection with the embodiment of FIG. 2 will be quoted in the description to follow.

In FIG. 4, the holding circuit is designated by numeral 23 and it comprises a NOT circuit 23a, a time-delay resistor 23b and a time-delay capacitor 23c so that the holding circuit holds the pressure reducing signal from the braking pressure control circuit 1 for a predetermined time of 1.0 second, for example, depending on the time constant of the time-delay resistor 23b and the time-delay capacitor 23c. Numeral 24 designates a NOT circuit which inverts the phase of its input signal.

Figure 5:
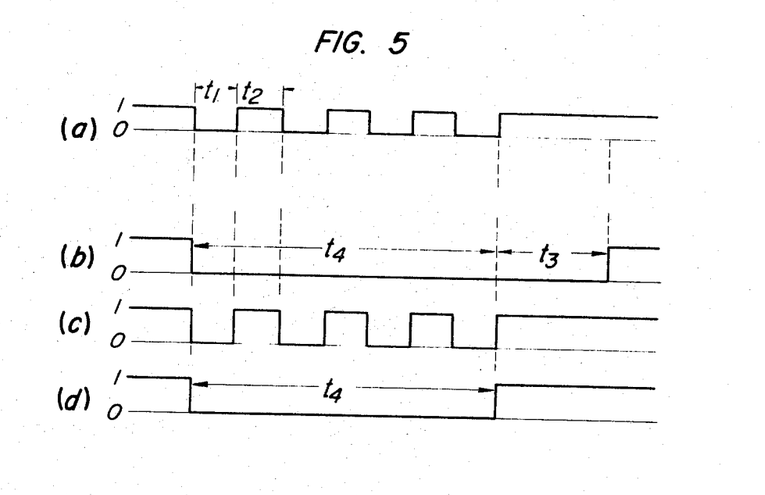
FIGS. 5(a) through 5(d) are diagrams showing the voltage waveforms at various points which are useful for explaining the operation of the system of the present invention.

In operation, when the braking pressure control circuit 1 is in the normal condition, even if the pressure reducing signal is produced, its duration time will not be longer than 0.5 seconds so that the signal appears as a pulse-like signal. Thus, the transistor 5 is turned on and off repeatedly by the pressure reducing signal with the result that at the collector of the transistor 5 a "0" signal is produced for each conduction thereof, while a "1" signal is produced whenever the transistor 5 is turned off. The waveshape of the pressure reducing signal may take the form of a pulse waveform as shown in FIG. 5(a) in which a time $t_1$ indicates the duration time of the pressure reducing signal which is selected to be less than 0.5 seconds. Then, in response to the pressure reducing signal described the braking pressure modulator 50 comes into operation so that the actuation detecting switch 21 produces "1" (open) and "0" (closed) signals as shown in FIG. 5(c) in response to the pressure reducing signal as shown in FIG. 5(a). On the other hand, the "0" signal produced at the collector of the transistor 5 upon the conduction thereof is held by the holding circuit 23 for a predetermined time of 1.0 second which is dependent upon the time constant of the resistor 23b and the capacitor 23c and the output of the holding circuit 23 is then inverted by the NOT circuit 24. Thus, in response to the pressure reducing signal shown in FIG. 5(a) the NOT circuit 24 produces the signal shown in FIG. 5(b) in which a time $t_3$ indicates the said predetermined time of 1.0 second.

Assuming now that the braking pressure control circuit 1 is at fault and the pressure reducing signal is continuously produced thereby rendering the final stage transistor 5 continually conductive, or causing the transistor 5 to break and remain conductive or causing the magnetic coil 3 to be short-circuited to the ground, the magnet coil 3 will be kept energized and the actuation detecting circuit 21 remains closed so that a "0" signal is produced at the collector of the transistor 5, whereas the actuation detecting switch 21 produces a "0" signal. Consequently, the AND circuit 8 for forming the logical product of the "0" signal which is the output of the holding circuit 23 inverted by the NOT circuit 24 and the "1" signal which is the "0" signal from the actuation detecting switch 21 also inverted by the NOT circuit 7, produces a "0" signal which denotes that the braking pressure modulator 50 is properly operative in spite of the presence of the abnormal pressure reducing signal.

Furthermore, when the braking pressure control circuit 1 is in the normal condition thus producing no pressure reducing signal so that the transistor 5 is in the non-conduction state and there is no ground fault in the magnetic coil 3, then should for some reason a portion of the braking pressure modulator 50 fail in the direction which allows the braking pressure to be reduced continuously thereby causing a fault condition in which the actuation detecting switch 21 is kept closed, that is, the condition similar to one obtainable when the pressure reducing signal is allowed to be produced continually, the actuation detecting switch 21 will continue to produce a "0" signal. While on the other hand, the transistor 5 produces a "1" signal at the collector thereof and the AND circuit 8 forms the logical product of the "1" signal which is the output of the holding circuit 23 inverted by the NOT circuit 24 and the "1" signal which is the "0" signal from the actuation detecting switch 21 inverted by the NOT circuit 7 so that the AND circuit 8 produces a "1" signal. In this case, the "1" signal from the AND circuit 8 indicates that in spite of the fact that no pressure reducing signal is produced, the braking pressure modulator 50 is defective at some portion thereof for some reason or other. The "1" signal from the AND circuit 8 is then applied to the OR circuit 9 along with the "0" signal which is the "1" signal produced at the collector of the transistor 5 and inverted by the NOT circuit 6 so that the OR circuit 9 produces a "1" output signal which is the "1" signal from the AND circuit 8. When this "1" signal remains on longer than a predetermined time of 3.0 seconds, for example, that is, at the expiration of a time longer than 3.0 seconds after the failure of the braking pressure modulator 50 in the direction which allows the braking pressure to be reduced continuously, the NOT circuit 12a in the timer circuit 11 inverts the phase of the "1" signal to produce a "0" signal which actuates the flip-flop circuit of the memory circuit 13 to produce a "0" signal at its output terminal. This "0" signal is inverted in the NOT circuit 16 to produce a "1" signal which is then applied to the base of the transistor 17, thereby switching the transistors 17 and 18 to the conduction state. When this happens, the warning device lamp 19 is lit thus giving warning that the braking pressure modulator 50 is faulty in the direction which allows the continued releasing of the braking pressure, while on the other hand the relay coil 22a of the relay 22 is energized to open the normally closed contacts 22b, thus disconnecting the magnetic coil 3 from the power source.

On the other hand, if the pressure reducing signal is produced at a short recurrent period as shown in FIG. 5(a) and it is terminated at the same recurrent period, the delay attended by the mechanical operation of the braking pressure modulator 50 will prevent the diaphragm 52a from readily returning to its normal position where no pressure reducing signal is produced and thus the diaphragm 52a remains in the position moved into the chamber 54 so that during this delay time the actuation detecting switch 21 is kept closed continuously for a time $t_4$ as shown in FIG. 5(d) in response to the pressure reducing signal shown in FIG. 5(a). This causes the switch 21 to continuously produce a "0" signal presenting a condition as if the braking pressure modulator 50 were faulty. In this case, however, if the pressure reducing signal is generated at a short recurrent period as shown in FIG. 5(a), the holding circuit 23 will hold the pressure reducing signal so that the NOT circuit 24 continuously produces a "0" signal for a time period $t_4 + t_3$ as shown in FIG. 5(b). Since at this time the actuation detecting switch 21 is kept closed continuously thus producing the "0" signal, the AND circuit 8 forms the logical product of the "1" signal which is the "0" signal produced by the switch 21 and inverted by the NOT circuit 7 and the "0" signal from the NOT circuit 24, thereby producing a "0" signal. However, since application of this "0" signal to the OR circuit 9 can merely cause the OR circuit 9 to produce a signal of opposite phase to that of the pressure reducing signal inverted by the NOT circuit 6 as shown in FIG. 5(a). The "0" signal is not inverted in the timer circuit 11 and hence the lamp of the warning device 19 is not lit.

Now, assume that the pressure reducing signal is produced at a short recurrent period as shown in FIG. 5(a) so that, as previously mentioned, the actuation detecting switch 21 is kept closed continuously for the time $t_4$ as shown in FIG. 5(d). Then, if, for example, the duration of a time $t_2$ shown in FIG. 5(a) at which a next pressure reducing signal is generated following the termination of the preceding signal is longer than the predetermined time of 3.0 seconds for the timer circuit 11, the "1" signal which is the inverted form of the "0" signal produced by the actuation detecting switch 21 will be applied to one input terminal of the AND circuit 8.

On the other hand, the holding circuit 23 holds the pressure reducing signal even if it has been terminated so that the NOT circuit 24 produces a "0" signal which is in turn applied to the other input terminal of the AND circuit 8. This causes the AND circuit 8 to produce a "0" signal. Thus, in like manner as previously mentioned, when applied to the OR circuit, this "0" signal can merely cause the OR circuit 9 to produce a signal which is the inverted pressure reducing signal from the NOT circuit 6 so that no phase invertion takes place in the timer circuit 11, hence the lamp of the warning device 19 is not lit. In view of the operation described, the predetermined time which is dependent on the discharge time constant of the holding circuit 23 may be properly selected to be longer than a time period $t_1 + t_2$ shown in FIG. 5(a).

Figure 6:
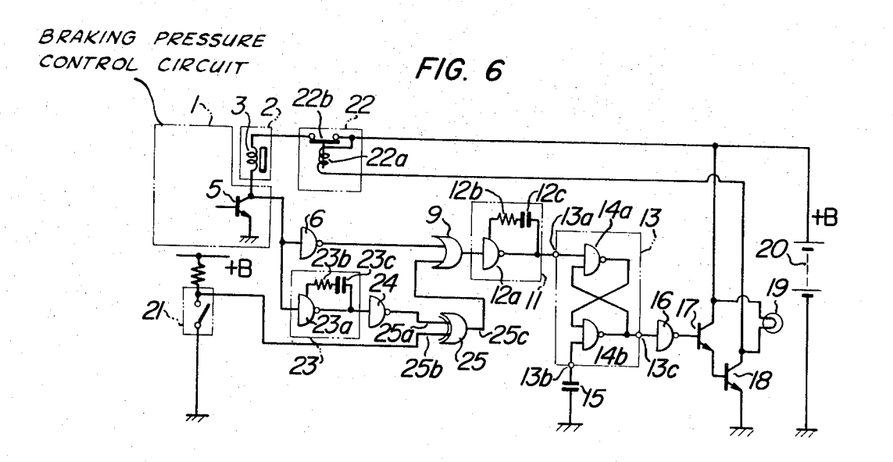
FIG. 6 is an electrical wiring diagram showing a further embodiment of the present invention.

Next, a further embodiment of the present invention illustrated in FIG. 6 will be explained. In the figure, those which are identical with the elements used in the first and second embodiments are designated by the identical reference numerals. The system of this third embodiment is identical with that of the second embodiment excepting that an exclusive OR circuit is substituted for the AND circuit 8. Therefore, the operation of this embodiment will be explained with particular reference to the exclusive OR circuit.

The holding circuit 23 comprises the NOT circuit 23a, resistor 23b and capacitor 23c. When the transistor 5 of the braking pressure control circuit 1 is rendered conductive thus producing a "0" signal, i.e., the pressure reducing signal at the collector thereof, the holding circuit 23 holds this pressure reducing signal for a predetermined time of 1.0 second, for example, depending on the time constant of the resistor 23b and the capacitor 23c, and the output of the holding circuit 23 is inverted by the NOT circuit 24. Thus, when the "0" signal (pressure reducing signal) is applied to the input terminal of the holding circuit 23, the NOT circuit 24 produces at its output a "0" signal for a predetermined time of 1.0 second, for example, which is dependent on the time constant of the resistor 23b and the capacitor 23c. Numeral 25 designates an exclusive Or circuit having one input terminal 25a connected to the output terminal of the NOT circuit 24 and the other input terminal 25b connected to the ungrounded end of the actuation detecting switch 21, while its output terminal 25c is connected to the input terminal of the OR circuit 9. The truth table for the exclusive OR circuit 25 is as follows:

| Input terminal 25a | Input terminal 25b | Output terminal 25c |
|---|---|---|
| 1 | 1 | 0 |
| 1 | 0 | 1 |
| 0 | 1 | 1 |
| 0 | 0 | 0 |

According to this embodiment, the duration time of the normal pressure reducing signal is not longer than 0.5 second. Thus, no phase inversion of the signal takes place in the NOT circuit 12a and the flip-flop circuit comprising the NAND circuits 14a and 14b does not operate, thereby the same condition as attained upon connection of the power source, that is, the output is maintained such that a "1" signal is produced at the output terminal 13c to thereby render the transistors 17 and 18 non-conductive. The reason is that the reset capacitor 15 is adapted to set the flip-flop circuit in the condition described upon connecting the power source. Consequently, the transistors 17 and 18 remain in the non-conduction state so that the lamp of the warning device 19 is not lit and the normally closed contacts of the relay 22 also remain closed.

Assuming that the braking pressure control circuit 1 is faulty continuing to produce the pressure reducing signal so that the final stage transistor 5 is turned on continually, or the transistor 5 is caused to break and remain conductive or the magnetic coil 3 is short-circuited to the ground, the magnetic coil 3 will be kept energized and the actuation detecting switch 21 remains closed. Thus, the exclusive OR circuit 25 forms the exclusive logical sum of the "0" signal from the NOT circuit 24 and the "0" signal from the actuation detecting circuit 21. Consequently, the exclusive OR circuit 25 produces a "0" signal which indicates that in spite of the occurrence of such abnormal pressure reducing signal the braking pressure modulator 50 is properly operative. While on the other hand, the "0" signal produced at the collector of the transistor 5 under the fault condition described is applied to the NOT circuit 6 where its phase is inverted to produce a "1" signal which is in turn applied to the OR circuit 6 along with the previously mentioned "0" signal from the exclusive OR circuit 25. This causes the OR circuit 9 to produce a "1" signal. In this case, since the pressure reducing signal is being produced, the "1" signal from the OR circuit 9 has a duration time longer than a predetermined time of 3.0 seconds, for example, which is dependent on the timer circuit 11 so that its phase is inverted by the NOT circuit 12a in the timer circuit 11 causing the flip-flop circuit of the memory circuit 13 to produce a "0" signal at its output terminal 13c. The phase of this "0" signal is inverted by the NOT circuit 16 to produce a "1" signal which is then applied to the base of the transistor 17 to switch it to the conduction state. Then, the transistor 18 is also rendered conductive so that a current is supplied from the battery 20 through the transistors 17 and 18 to the lamp of the warning device 19, which in turn comes on to indicate that there is a ground fault in either the braking pressure control circuit 1 or the magnetic coil 3. While on the other hand, the relay coil 22a of the relay 22 is energized to open the normally closed contacts 22 and thus to disconnect the magnetic coil 3 from the power source, thereby automatically returning the vehicle to the condition in which no pressure reducing signal is present, that is, the condition in which normal braking operation can take place.

In the normal conditions of the braking pressure control circuit 1 producing no pressure reducing signal and thus rendering the transistor 5 non-conductive and in the event that no ground fault exists in the magnetic coil 3, should for some reason or other the braking pressure modulator 50 become faulty at some part thereof in the direction which allows the braking pressure to be reduced continuously and the actuation detecting circuit 21 remains closed continuously producing a "0" signal, a "1" signal will be produced at the collector of the transistor 5 and hence the NOT circuit 24 produces a "1" signal. The "1" signal from the NOT circuit 24 is then applied to the exclusive OR circuit 25 along with the "0" signal from the actuation detecting switch 21 so that the OR circuit 25 produces a "1" signal. In this case, the "1" signal from the OR circuit 25 indicates that in spite of the absence of a pressure reducing signal the braking pressure modulator 50 is faulty at some part thereof for some reason or other.

Thus, when the "1" signal from the exclusive OR circuit 25 and the "0" signal which is the "1" signal produced at the collector of the transistor 5 and inverted by the NOT circuit 6 are applied to the OR circuit 9, the output signal of the OR circuit 9 assumes the "1" state. Then, when this "1" signal remains on longer than a predetermined time of 3.0 seconds, for example, that is, at the expiration of more than 3.0 seconds after the braking pressure modulator 50 has failed in the direction which allows the braking pressure to be reduced continuously, the NOT circuit 12a in the timer circuit 11 inverts the phase of the signal to produce a "0" signal which is then applied to the memory circuit 13. This in turn actuates the flip-flop circuit of the memory circuit 13 to produce at the output terminal thereof a "0" signal which is then inverted by the NOT circuit 16 to produce a "1" signal. This "1" signal is then applied to the base of the transistor 17 to switch the transistors 17 and 18 to the conducting state. Consequently, the lamp of the warning device 19 comes on to give warning that the braking pressure modulator 50 is faulty in the direction which allows the continued releasing of the braking pressure, while on the other hand, the relay coil 22a of the relay 22 is energized so that the normally closed contacts 22b are open to disconnect the magnetic coil 3 from the power source.

In the event that the braking pressure modulator 50 becomes faulty for some reason or other and thus fails to reduce the braking pressure in the presence of the pressure reducing signal, this could be a type of fault on the fail safe side. In this case, however, the transistor 5 will be rendered conductive so that a "0" signal is produced at its collector and hence a "0" signal is also produced at the output of the NOT circuit 24. At this time, the actuation detecting switch 21 is producing a "1" signal. Thus, the exclusive OR circuit 25 receives this "1" signal and the "0" signal from the NOT circuit 24 thereby producing a "1" signal. When this happens, the OR circuit 9 receives the "0" signal which is the "1" signal produced at the collector of the transistor 5 and inverted by the NOT circuit 6 and the "1" signal from the exclusive OR circuit 25 and it thus produces a "1" signal as its output, which "1" signal is then applied to the timer circuit 11. Since the actuation detecting switch 21 continuously produces its "1" signal, the "1" signal applied to the timer circuit 11 has a duration time longer than a predetermined time of 3.0 seconds which is dependent on the time constant of the resistor 12b and the capacitor 12c in the timer circuit 11. Thus, the NOT circuit 12a in the timer circuit 11 inverts the phase of the signal to produce a "0" signal. This "0" signal is then applied to the flip-flop circuit of the memory circuit 13 and thus it acts to produce a "0" signal at its output terminal 13c. The "0" signal is then applied to the NOT circuit 16 which inverts it to produce a "1" signal which in turn renders the transistors 17 and 18 conductive. This causes the lamp of the warning device 19 to come on thereby giving warning and at the same time the normally closed contacts 22b of the relay 22 are opened to thereby disconnect the magnetic coil 3 from the power source.

When the pressure reducing signal is generated at a very short recurrent period of less than 1.0 second in the pulse-like form, the delay attended by the mechanical operation of the braking pressure modulator 50 will prevent the diaphragm 52a from readily returning completely to the original position each time the pressure reducing signal is terminated. Thus, if the pressure reducing signal is generated at such a very short recurrent period, the diaphragm 52a remains in the position moved into the chamber 53 so that the actuation detecting switch 21 is kept closed thus continuously producing a "0" signal. On the other hand, if the brake pedal 40 is moved to a relatively small degree, then the braking pressure applied to the wheel cylinder 35 will be small, hence the pressure in the chamber 57a is also small so that the piston 55 can return to the original position in a relatively quick manner upon termination of the pressure reducing signal. However, in the event that the brake pedal 40 is pressed hard so that an excessively large braking pressure is applied, the pressure in the chamber 57a maintains a relatively high level even if the piston 55 is moved toward the diaphragm 52a to reduce the braking pressure in response to the pressure reducing signal. Thus, depending on the spring constant of the spring 52b, it is possible that upon termination of the pressure reducing signal the piston 55 cannot return to the original position against the pressure in the chamber 57a so that during the time interval between the termination of the pressure reducing signal and the time at which the piston 55, hence the diaphragm returns so the original position the actuation detecting switch 21 would remain closed thus continuously generating the "0" signal even after the termination of the pressure reducing signal. According to the experimental tests conducted by the inventors, the maximum possible time period during which the actuation detecting switch 21 would continue to produce the pressure reducing signal was 50 msec, while the predetermined time which is dependent on the time constant of the capacitor 23c and the resistor 23b in the holding circuit 23 is selected to be the previously mentioned value of 1.0 second, for example, which is longer than 50 msec. Thus, in the event that the pressure reducing signal is produced at a short recurrent period of less than 1.0 second, the pressure reducing signal will be held for the predetermined time of 1.0 second as determined by the time constant of the capacitor 23c and the resistor 23b in the holding circuit 23 so that the NOT circuit 24 continues to produce a "0" signal. Similarly, if the previously mentioned excessively large braking pressure is applied, the holding circuit 23 holds the pressure reducing signal which is on the point of termination for the predetermined time of 1.0 second so that the NOT circuit 24 continues to produce a "0" signal. Consequently, even if the actuation detecting switch 21 continues to produce its "0" signal for the reasons mentioned above, the exclusive OR circuit 25 produces a "0" signal as its output since both of the input signals applied thereto are "0" and this "0" signal is then applied to the OR circuit 9. In this case, if the pressure reducing signal is produced at a short recurrent period of less than 1.0 second, the other input signal applied to the OR circuit from the NOT circuit 6 will be either "1" or "0" signal which is the inverted form of the pressure reducing signal, whereas when the previously mentioned excessively large braking pressure is applied the other input signal will be a "0" signal which is the inverted form of the "1" signal since the time under consideration is the time of termination of the pressure reducing signal. In either of these cases, no phase inversion takes place in the NOT circuit 12a of the timer circuit 11 so that the timer circuit produces a "1" signal and hence a "1" is produced at the output terminal 13c of the flip-flop circuit in the memory circuit 13. Thus, the transistors 17 and 18 are turned off, hence the lamp of the warning device 19 is not lit and the magnetic coil 3 is not disconnected from the power source.

What we claim is:

1. A fault detecting system for vehicle anti-skid control systems comprising:
   a braking pressure control circuit for detecting a tendency for the wheel to lock and the locking of the wheel to generate an electrical signal for reducing the braking pressure applied to the wheel,
   a braking pressure modulator which is energized by the output signal from said braking pressure control circuit to reduce the braking pressure applied to the wheel,
   an actuation detector for detecting the actuation of said braking pressure modulator to generate an electrical signal,
   a first logical means connected to produce a signal when at least one of said actuation detector and said braking pressure control circuit produces a signal,
   a second logical means connected to produce a signal when either said first logical means or said braking pressure control circuit produces a signal,
   a timer circuit for producing an output signal when the output signal from said second logical means remains on in excess of a predetermined time thereby detecting a fault in said control system, and
   a memory circuit for storing the output signal from said timer circuit.

2. A fault detecting system for vehicle anti-skid control systems according to claim 1, further including control means for receiving the output signal from said memory circuit and acting to attend to the fault in an anti-skid control system.

3. A fault detecting system for vehicle anti-skid control systems according to claim 2, further including a holding circuit for holding the output signal from said braking pressure control circuit for a predetermined time.

4. A fault detecting system for vehicle anti-skid control systems according to claim 1, further including switch means for receiving the output signal from said memory circuit to disconnect said braking pressure modulator from the power source.

5. A fault detecting system for vehicle anti-skid control systems according to claim 4, further including a holding circuit for holding the output signal from said braking pressure control circuit for a predetermined time.

6. A fault detecting system for vehicle anti-skid control systems according to claim 1, further including warning means for receiving the output signal from said memory circuit to come into operation.

7. A fault detecting system for vehicle anti-skid control system according to claim 6, further including a holding circuit for holding the output signal from said braking pressure control circuit for a predetermined time.

8. A fault detecting system for vehicle anti-skid control systems according to claim 1, further including a holding circuit for holding the output signal from said braking pressure control circuit for a predetermined time.

9. A fault detecting system for vehicle anti-skid control systems comprising a braking pressure control circuit for detecting a tendency for the wheel to lock and the locking of the wheel to generate an electrical signal for reducing the braking pressure applied to the wheel, a braking pressure modulator which is energized by the output signal from said braking pressure control circuit to reduce the braking pressure applied to the wheel, a holding circuit for holding the output signal from said braking pressure control circuit for a predetermined time, an actuation detector for detecting the actuation of said braking pressure modulator to produce an electrical signal, a first logical element for forming the exclusive logical sum of the output signal from said holding circuit and the output signal from said actuation detector, a second logical element for forming the logical sum of the output signal from said first logical element and the output signal from said braking pressure control circuit, a timer circuit for generating an output signal when the output signal from said second logical element remains on in excess of a predetermined time, and a memory circuit for storing the output signal from said timer circuit.

10. A fault detecting system for vehicle anti-skid control systems according to claim 9, further including control means for receiving the output signal from said memory circuit and acting to attend to the fault in an anti-skid control system.

11. A fault detecting system for vehicle anti-skid control systems according to claim 9, further including switch means for receiving the output signal from said memory circuit to disconnect said braking pressure modulator from the power source.

12. A fault detecting system for vehicle anti-skid control systems according to claim 9, further including warning means for receiving the output signal from said memory circuit to come into operation.

13. A fault detecting system for vehicle anti-skid control systems comprising
   a braking pressure control circuit for detecting a tendency for the wheel to lock and the locking of the wheel to generate an electrical signal for reducing the braking pressure applied to the wheel,
   a braking pressure modulator which is energized by the output signal from said braking pressure control circuit to reduce the braking pressure applied to the wheel,
   an actuation detector which cooperates with the braking pressure modulator for detecting the actuation of said braking pressure modulator and for generating an electrical signal in response thereto,
   logic circuit means connected to receive input signals from said actuation detector and said pressure control circuit for producing an output signal indicative of any malfunction of said braking pressure control circuit and said braking pressure modulator,
   a timer circuit for producing an output signal when the output signal from said logic circuit means remains on in excess of a predetermined time,
   and a memory circuit for storing the output signal from said timer circuit.

* * * * *